United States Patent [19]

Clemmer et al.

[11] 4,008,049

[45] Feb. 15, 1977

[54] APPARATUS FOR CONTROLLING OPERATIONAL PARAMETERS IN POLYMERIZATION EQUIPMENT

[75] Inventors: Clyde C. Clemmer; Ward C. Alcorn, III, both of Odessa, Tex.

[73] Assignee: Dart Industries Inc., Los Angeles, Calif.

[22] Filed: Oct. 30, 1972

[21] Appl. No.: 302,309

Related U.S. Application Data

[62] Division of Ser. No. 53,355, July 9, 1970, abandoned.

[52] U.S. Cl. .......................... 23/288 H; 23/253 A; 23/288 E; 23/288 K; 23/289; 73/341; 260/695; 260/700; 307/235 A; 307/310; 328/3; 526/61; 526/64; 526/82

[51] Int. Cl.² ................... B01J 3/04; C08F 110/02; C08G 85/00

[58] Field of Search ............... 260/94.9 R, 94.9 P, 260/95 A, 695, 698, 700; 23/289, 288 E, 288 H, 288 K, 284, 253 A, 230 A, 253 R; 235/151.12 R, 151.12 MO, 151.12 MI

[56] References Cited

UNITED STATES PATENTS

| | | |
|---|---|---|
| 2,852,501 | 9/1958 | Richard, Jr. et al. ......... 260/94.9 R |
| 3,079,372 | 2/1963 | Fulknier et al. ............. 260/94.9 R |
| 3,293,233 | 12/1966 | Erchak, Jr. et al. .......... 260/94.9 R |
| 3,294,773 | 12/1966 | Gans et al. .................... 260/94.9 R |
| 3,427,138 | 2/1969 | Donnelly et al. ............. 23/253 AX |
| 3,475,392 | 10/1969 | McCoy et al. ................ 23/253 AX |
| 3,506,715 | 4/1970 | Clark ............................ 23/230 AX |
| 3,582,629 | 6/1971 | Ross ......................... 235/151.12 X |
| 3,654,447 | 4/1972 | Bradley ....................... 23/253 AX |

Primary Examiner—Joseph Scovronek
Attorney, Agent, or Firm—Arthur S. Collins; Fred S. Valles

[57] ABSTRACT

In apparatus for polymerizing high-pressure ethylene to produce polyethylene, a tubular reactor is connected to a source of high pressure ethylene. An intensifier supplies an initiator solution to the tubular reactor. This solution includes one or more catalysts which promote the polymerization reaction. Within the tubular reactor, a peak temperature occurs in proximity of the point at which the catalysts are introduced. If the catalysts are introduced at more than one point, peak temperatures will result downstream of each of such points. For various reasons, the peak temperatures are displaced along the tubular reactor and a plurality of thermocouples are distributed at spaced positions in the tubular reactor to measure the temperatures at the positions at which the peak temperature might occur. These thermocouples generate signals which are fed into a gating arrangement which selects the peak signal which is compared in a comparator circuit with an adjustable or selectable signal representative of the peak temperature which is desired. A difference signal is generated which relates to the difference between the selected signal and the peak signal with which it is compared. This difference signal is converted by a transducer into a pressure signal which is fed to a control valve which controls the speed of operation of a pump feeding the catalysts into the reactor. If two or more pumps are employed for feeding the catalysts into different zones in the reactor, separate controls are provided for each of the pumps.

20 Claims, 6 Drawing Figures

APPARATUS FOR CONTROLLING OPERATIONAL PARAMETERS IN POLYMERIZATION EQUIPMENT

CROSS REFERENCE TO RELATED APPLICATION

This application is a division of patent application Ser. No. 53,355, filed July 9, 1970, now abandoned.

BACKGROUND

1. Field of Invention

This invention relates to apparatus and methods for the controlled polymerization of high pressure ethylene into polyethylene and to those types of processes in which temperature control is essential for assuring good quality as well as efficient and effective production.

2. Prior Art

While the invention relates generally to the controlling of processes in accordance with a peak or critical temperature which may shift back and forth in a reactor during a process, the invention will be best understood in terms of a preferred embodiment which is concerned with the polymerization of high pressure ethylene to produce polyethylene.

As set forth in U.S. Pat. No. 2,832,501 of Sept. 16, 1958 (W. R. Richard, Jr., et al.), polyethylene is an exceptionally important material of commerce suitable for use in molding and also having substantial use in film form. Polyethylene is most effectively produced by subjecting ethylene to the polymerizing action of elevated temperatures while the ethylene is confined within a tubular reactor or the like. The polymerization reaction is comparatively slow and it is known to employ an initiator solution which is introduced into the reactor to speed up the reaction. The solution includes catalysts such as, for example, benzoyl peroxide and various free-radical promoting catalysts. As will be seen, temperature peaks occur in reactors downstream of the position at which the initiator solution is introduced.

Some other patents relating basically to the production of polyethylene include U.S. Pat. No. 2,153,553 (Fawcett et al.) and U.S. Pat. No. 2,200,429 (Perrin et al.).

As further stated in U.S. Pat. No. 2,852,501, to obtain practical reaction rates and production yields, the ethylene catalyst mixture can be passed continually through a tubular reactor. Since the polymerization of ethylene is highly exothermic, conditions of temperature control are important and particularly peak temperatures which are reached within the reactor are of extreme importance. If too high a peak temperature occurs within the reactor, degradation of the product will result, this ranging in severity from discoloration of the polymer product to substantially complete carbonization of ethylene and polymer. For this reason it was sometimes believed preferable in the past to reduce various operational parameters to a lower value than would achieve an optimum yield in order to achieve a better quality of product. However, operating at milder reaction conditions does not necessarily assure trouble-free operation and sometimes degradation of the product can occur even at these reduced temperatures.

Pressure fluctuations occurring in reactors employed for the production of polyethylene result in temperature changes which also make the temperature difficult to monitor and control. Some of these pressure changes are incidental to reactions taking place during polymerization, but other pressure changes are purposefully employed to prevent the accumulation of polymer on the interior walls, these purposeful changes being known as "bump cycles" and being effected by the operation of "let-down" valves at the exit end of the reactor. This bump cycle may, for example, cause the reduction of pressure within a reactor from 40,000 psi to 35,000 psi, this being a drop of 5,000 psi which causes a shifting of the temperature profile throughout the reactor thus contributing to the difficulties experienced in monitoring peak or critical temperatures and controlling the associated process in accordance therewith.

Temperature profiles as mentioned hereinafter are discussed by way of example in U.S. Pat. No. 3,299,033 of Jan. 17, 1967 (R. M. Douglas). In this patent is discussed a method for continuously injecting a controlled volume of initiator solution through a line into a polymerization zone maintained at operating pressures in excess of 7,500 psi and in which zone the pressure is subjected to periodic pressure variations. The technique disclosed in this patent comprises applying and maintaining a pressure on the initiator solution in the line which is greater than the operating pressure existing in the reaction zone, continuously sensing the periodic pressure variations occurring in this zone, and continuously controlling the volume of initiator solution injected into this zone in response to the periodic pressure variations. This control is effective to increase the volume introduced during a pressure decrease in the reaction zone proportional to a resulting momentary increase in ethylene flow and is effective to decrease the volume introduced during a pressure increase in the reaction zone proportional to a momentary decrease in ethylene flow. This patent, moreover, discloses a control between an intensifying unit which supplies the initiator solution and the reactor into which the initiator solution is fed. It will appear from the description of a preferred embodiment of the present invention which follows hereinafter that an automatic control is provided for the operational speed of the intensifying unit by way of contrast to the control disclosed in U.S. Pat. No. 3,299,033 which, however, may be used in addition to the control of the invention.

Another intensifier is shown in U.S. Pat. No. 3,234,883 of Feb. 15, 1966 (R. M. Douglas et al.). This intensifier is a hydraulic intensifier system and provides for increasing the flow of initiator solution to a reactor by controlling the speed of an intensifier pump through the use of hydraulic pressure signals. The system shown in U.S. Pat. No. 3,234,883 may be employed in the apparatus of the instant invention, but the pressure signal which is employed to control the amount of initiator solution supplied to the reactor in accordance with the invention is generated in a unique and useful manner. Further discussion of intensifier systems and techniques is found in U.S. Pat. No. 3,234,882 of Feb. 15, 1966 (R. M. Douglas et al.).

In U.S. Pat. No. 3,079,372 of Feb. 26, 1963 (R. P. Fulknier et al.) is disclosed a system in which thermocouples are arranged at spaced intervals within a tubular reactor in temperature sensing contact with the contents of the reactor. Also provided is a product diversion valve which diverts product from a product collector. A valve actuator is provided which is responsive to the thermocouples to divert product when the temperature at any point in the reactor exceeds a predetermined level. A collector is disposed to receive the diverted product. As will be seen hereinafter, the invention detects a peak temperature in a reactor despite the positional shifting of the same and processes the signal to generate a basic signal to control the amount of initiator solution introduced into the reactor. This technique is of course wholly different from that disclosed in U.S. Pat. No. 3,079,372.

Other U.S. patents relating to the production of polyethylene include U.S. Pat. No. 2,870,130 of Jan. 20, 1959 (J. M. Davison et al.), U.S. Pat. No. 3,023,202 of Feb. 27, 1962 (M. M. Schappart), U.S. Pat. No. 3,053,640 of Sept. 11, 1962 (J. G. Kirkpatrick et al.), U.S. Pat. No. 3,236,828 of Feb. 22, 1966 (D. E. Carter et al.) and U.S. Pat. No. 3,293,233 of Dec. 20, 1966 (M. Erchak, Jr., et al.).

SUMMARY OF INVENTION

It is an object of the invention to provide improved apparatus for the polymerization of high pressure ethylene and more generally to provide improved apparatus for controlling critical temperatures in processes in which temperatures may vary, but are subject to control.

Another object of the invention is to provide improved apparatus for controlling the introduction of catalysts into materials undergoing polymerization in order to control operational parameters such as temperatures in such materials.

Yet another object of the invention is to provide improved means for monitoring peak temperatures in reactors wherein such peak temperatures are susceptible of being positionally shifted.

Yet another object of the invention is to provide improved electronic circuits capable of distinguishing between a plurality of electrical signals representing the temperatures at various points within a reactor to select the critical signal therefrom and to use such critical signal in controlling the magnitude of the associated critical temperature.

A further object of the invention is to provide improved methods and apparatus for improving the quality and yield of products such as polymers by controlling the introduction of catalysts associated with the production thereof.

To achieve the above and other objects of the invention, there is provided an apparatus comprising a source of materials and an elongated reaction system coupled thereto in which a process involving these materials takes place. Where, for example, the polymerization of high pressure ethylene is involved, the high pressure ethylene will be fed into a tubular reactor and at one or more zones of the reactor there will be introduced catalysts which promote the polymerization and affect the quantity and quality of the polyethylene produced.

With reference to the general type of apparatus contemplated in accordance with the invention, peak or other such critical temperatures will occur within the reactor which, for various reasons, may shift back and forth positionally along the reactor. In accordance with the invention, there are provided circuits which detect the critical temperature despite the movement of the same within the reactor and which employ this critical temperature to generate a corrective signal to adjust the magnitude of this temperature.

In the case of polymerization of high pressure ethylene, the corrective signal is employed to adjust the quantity of catalyst injected into the high pressure ethylene. In accordance with one embodiment of the invention, this is accomplished by converting the difference signal generated by a comparator, which compares the critical temperature signal with a selectable signal representative of the magnitude of the desired critical temperature, into a pressure signal, which is used to control a catalyst pump.

According to a further feature of the invention, temperatures are measured at positions, spaced along a tubular reactor, by thermocouples which generate signals which are fed into a gating circuit which selects the critical signal therefrom. Since generally it will be the peak signal which is of greatest importance, the gating circuit will select the peak signal from those signals supplied thereto. The thusly selected signal is fed into a controller or comparator within which can be selected a signal which is representative of the desired peak temperature in the reactor. A difference signal is generated which is fed to a transducer which converts the same into a pressure signal controlling a valve which in turn controls the speed of a pump supplying one or more materials to the tubular reactor. According to a further feature of the invention, the peak or critical temperature is fed to a recording and display device so that an operator can monitor trends in the operation.

Materials can be injected into reactor apparatus of the invention at a plurality of positions in which event the critical temperature in reactor zones relating to each such position will be monitored in accordance with the invention.

Other objects and features of the invention, as well as advantages thereof will appear from the detailed description which follows hereinafter as illustrated in the accompanying drawing.

DETAILED DESCRIPTION

Figure 1:
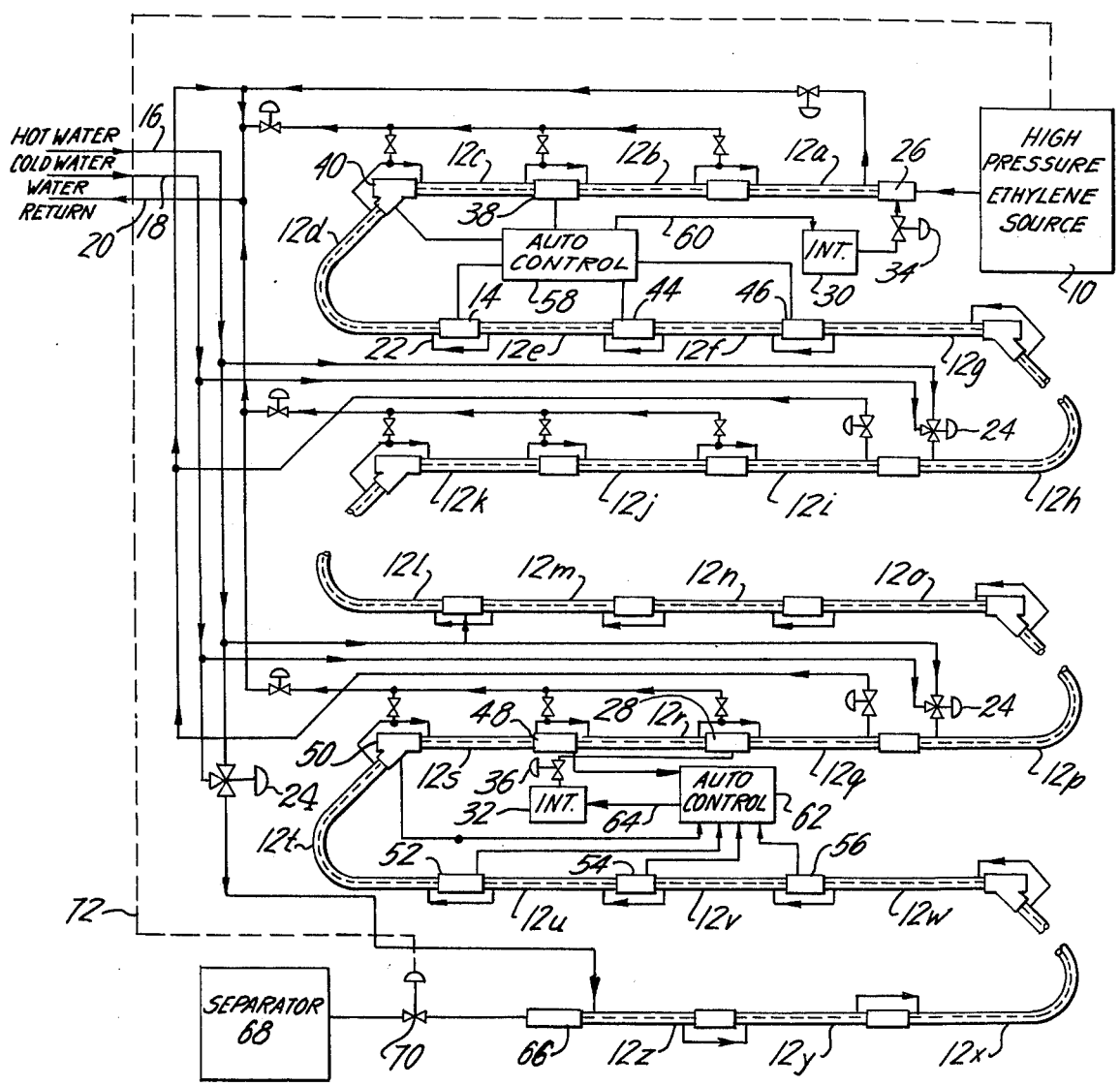
FIG. 1 diagrammatically illustrates a polyethylene reactor including the improvements of the invention.

The apparatus illustrated in FIG. 1 is the essential sections of a polyethylene tubular reactor. Therein, for example, the pressure can vary up to 60,000 psi and greater and the temperatures can vary from about 225° F up to 700° F and possibly greater. The usual operating pressure in the preferred embodiment of the invention will, however, generally vary in the order of 30,000 ± 10,000 psi, whereas the temperature may vary between 500° and 600° F and preferably within a range of from 550°–600° F.

More particularly, the reactor of FIG. 1 comprises a source 10 of high pressure ethylene feeding into a tubular reactor consisting of a plurality of tubular sections 12a to 12z. These tubular sections are connected in series relation by blocks such as the block 14 between sections 12d and 12e.

As is well known, the tubular sections have water jackets (not shown) operatively associated therewith. These tubular jackets are supplied with hot water via a line 16 and cold water via a line 18, there being provisions made for water return via a line 20. The block 14 constitutes discontinuities in the water jackets and are bypassed as indicated by line 22. Valves such as indicated at 24 are distributed throughout the water jacket system to provide for varying the flow of hot and cold water, these valves serving to a limited extent to control temperature within the reactor.

According to known techniques, an initiator solution including, for example, a peroxide initiator in a solvent, is introduced into the reactor system to promote polymerization and improve and control the quality and quantity of the polyethylene produced therein. This initiator solution in the illustrated reactor is introduced into the block indicated at 26 and at the block indicated at 28. The source of the initiator solution is the intensifier 30 with respect to the block 26 and the intensifier 32 with respect to the block 28. The intensifier construction may be as indicated in U.S. Pat. No. 3,234,882, which issued Feb. 15, 1966 (R. M. Douglas, et al.).

The intensifier 30 is connected to the associated block through a valve 34, whereas the intensifier 32 is connected to the associated block through a valve 36. These valves, which control the flow of initiator solution into the reactor, may be valves such as indicated in U.S. Pat. No. 3,299,033 which issued Jan. 17, 1967 (R. M. Douglas).

As will be described in greater detail hereunder, the introduction of initiator solution into the system at positions corresponding to the blocks 26 and 28 will result in peak temperatures which will occur at varying positions within two zones downstream of respective of said blocks. To measure temperatures within these zones, thermocouples are installed in the blocks in the first zone indicated at 38, 40, 14, 44 and 46 and in the second zone in the blocks indicated at 48, 50, 52, 54 and 56. Additional thermocouples may be installed in the remaining blocks but will not be used in accordance with this embodiment of the invention.

The thermocouples in the first zone are coupled to an automatic control 58 connected via line 60 to intensifier 30. The thermocouples in the second zone are coupled to an automatic control 62 connected via line 64 to intensifier 32. The details and operation of these two automatic controls will be described in greater detail hereinafter.

The upstream end of the tubular reactor is constituted by the block 26. The downstream end of the tubular reactor is indicated at 66. The downstream end discharges into a separator 68 which functions to separate the ethylene and polyethylene. The functions of the separator are described in U.S. Pat. No. 2,852,501, which issued Sept. 16, 1958 (W. R. Richard, Jr., et al.). Valve 70 is a high pressure letdown valve functioning to reduce the pressure in the tubular reactor periodically to cause a pressure reduction therein for minimizing the accumulation of polymer within the reactor. For example, with a pressure of 40,000 psi employed within the reactor, valve 70 will provide for a 5,000 psi reduction every thirty seconds to a pressure of 35,000 psi. This "bump cycle" is a known technique and is not within the scope of the present invention, except for the fact that it contributes to peak temperature displacements within the reactor with which the present invention is concerned. Valve 70 is shown as coupled via line 72 to source 10 since it is a back-pressure controller.

As has been indicated above, an essential part of the apparatus illustrated in FIG. 1 is constituted by the thermocouples which are spaced downstream of the positions at which initiator solution is introduced into the reactor system. These thermocouples are mounted, as shown by way of example, in FIG. 2 wherein is seen block 38 connecting tubular sections 12b and 12c.

Tubular section 12b comprises a flange 74 connected to block 38 by means of bolts 76 and 78. Tubular section 12c comprises flange 80 connected to block 38 by bolts 82 and 84. Within block 38 is defined recess 85 through which is extended tip 86 of thermocouple elements well known in the art.

A complete thermocouple structure is illustrated with respect to tip 86. This tip is a part of sheathed thermocouple 87 which at end 88 is connected to braided lead wire 90 terminating in a connect-disconnect type plug 92. Plug 92 leads the signal generated in the thermocouple to a circuit arrangement which will be described hereinafter. Sheathed thermocouple 87 is mounted within plug 94. The combined thermocouple 87 and plug 94 are mounted within fitting 96 for accommodation within recess 85 by means of threads 98. The thermocouples may be of various types mounted in any suitable manner, the locations rather than the details of the thermocouples being significant in the invention.

Figure 2:
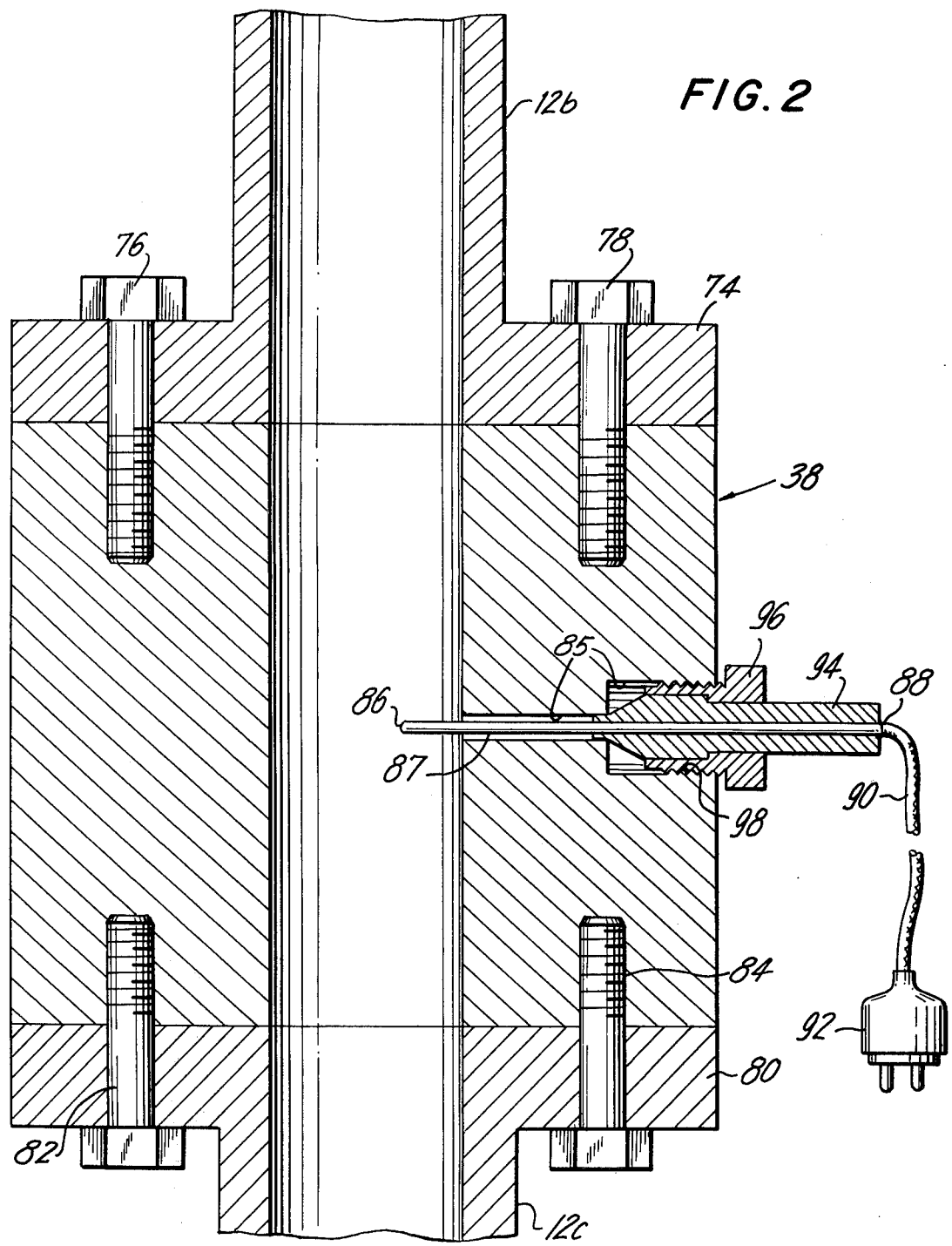
FIG. 2 illustrates a detail of the reactor of FIG. 1 with respect to the taking of temperature measurements in the reactor.
Figure 3:
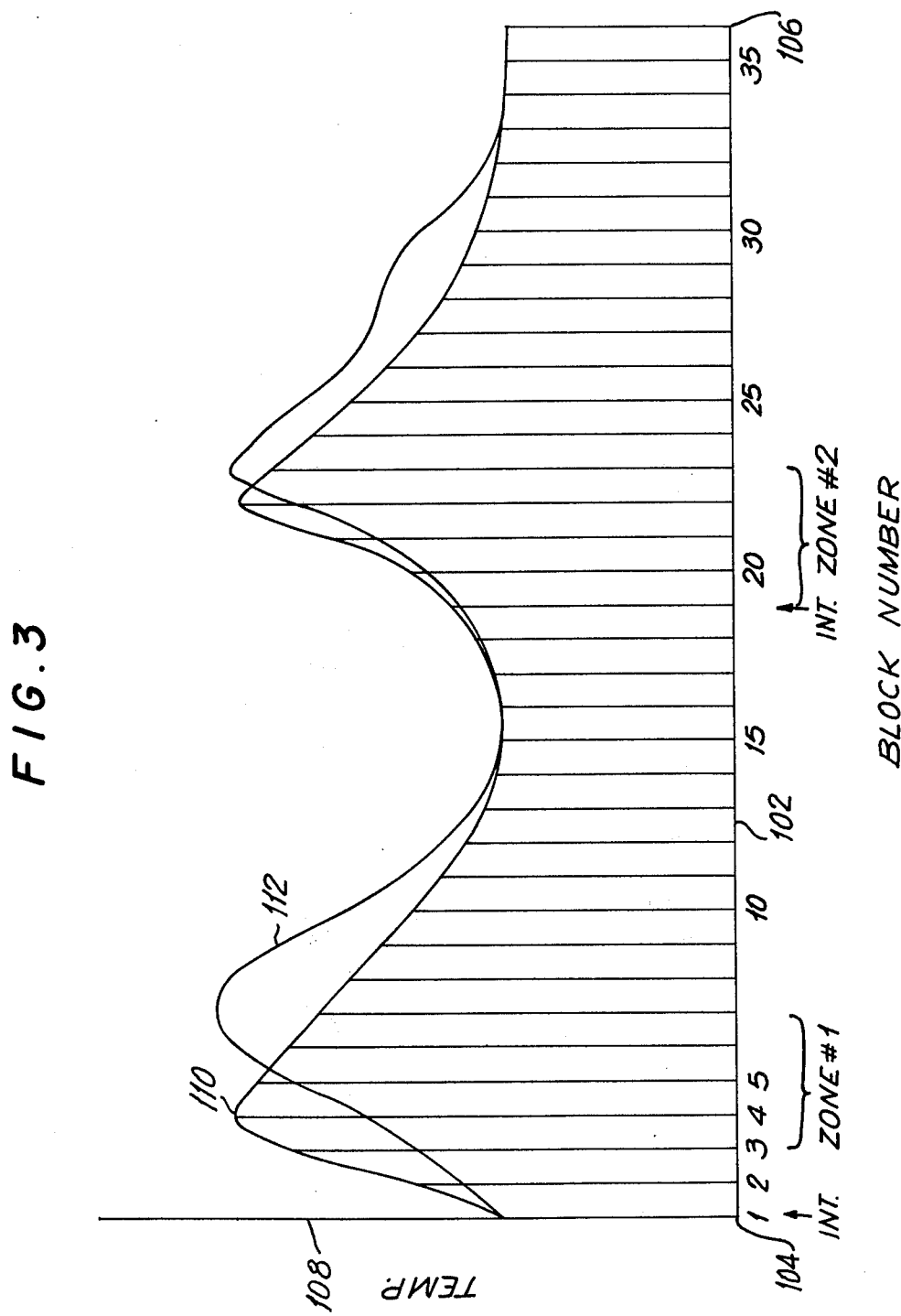
FIG. 3 is a chart illustrative of possible temperature profiles in the reactor of FIG. 1.

FIG. 3 is a chart illustrating temperature profiles in a typical tubular reactor of the type described hereinabove wherein are included thirty-six blocks within selected of which may be installed one or more thermocouples in the manner indicated, for example, in FIG. 2.

The abscissa 102 in FIG. 3 indicates the block number commencing with the upstream end 104 and terminating with the downstream end 106 of the tubular reactor. The ordinate 108 indicates temperatures of increasing degree. Curve 110 indicates, by way of example, a peak occurring at block number 4 and a second peak occurring at block number 22. These peaks are substantially immediately adjacent and downstream of block numbers 1 and 19 to which intensifiers are connected. Curve 112 illustrates the profile for a subsequent period of the process. This curve illustrates that the peaks have shifted and now occur at block numbers 7 and 23.

Reasons for the shifting of the peaks include the bump cycle referred to hereinabove as well as changing conditions within the reactor such as, for example, adherence to the interior wall of the reactor of polymer which is generated and so forth. Experience has shown, however, that the peaks will move to a limited extent only and that the temperature peaks can be monitored by thermocouples arranged in two groups of five blocks each, defining first and second zones located downstream of the blocks through which initiator solution is introduced into the reactor. For the normal velocities of material through the reactor, i.e. about 5 to 100 feet per second, the peak temperature will be within the five blocks. The distance between blocks can range from about 5 to 60 feet depending on the diameter of the reactor and the velocity of material through the reactor. The distance is such that once the peak temperature has been determined as disclosed herein, the temperature in the adjacent downstream thermocouple is a few degrees lower than the peak temperature and no more than 10° F.

Figure 4:
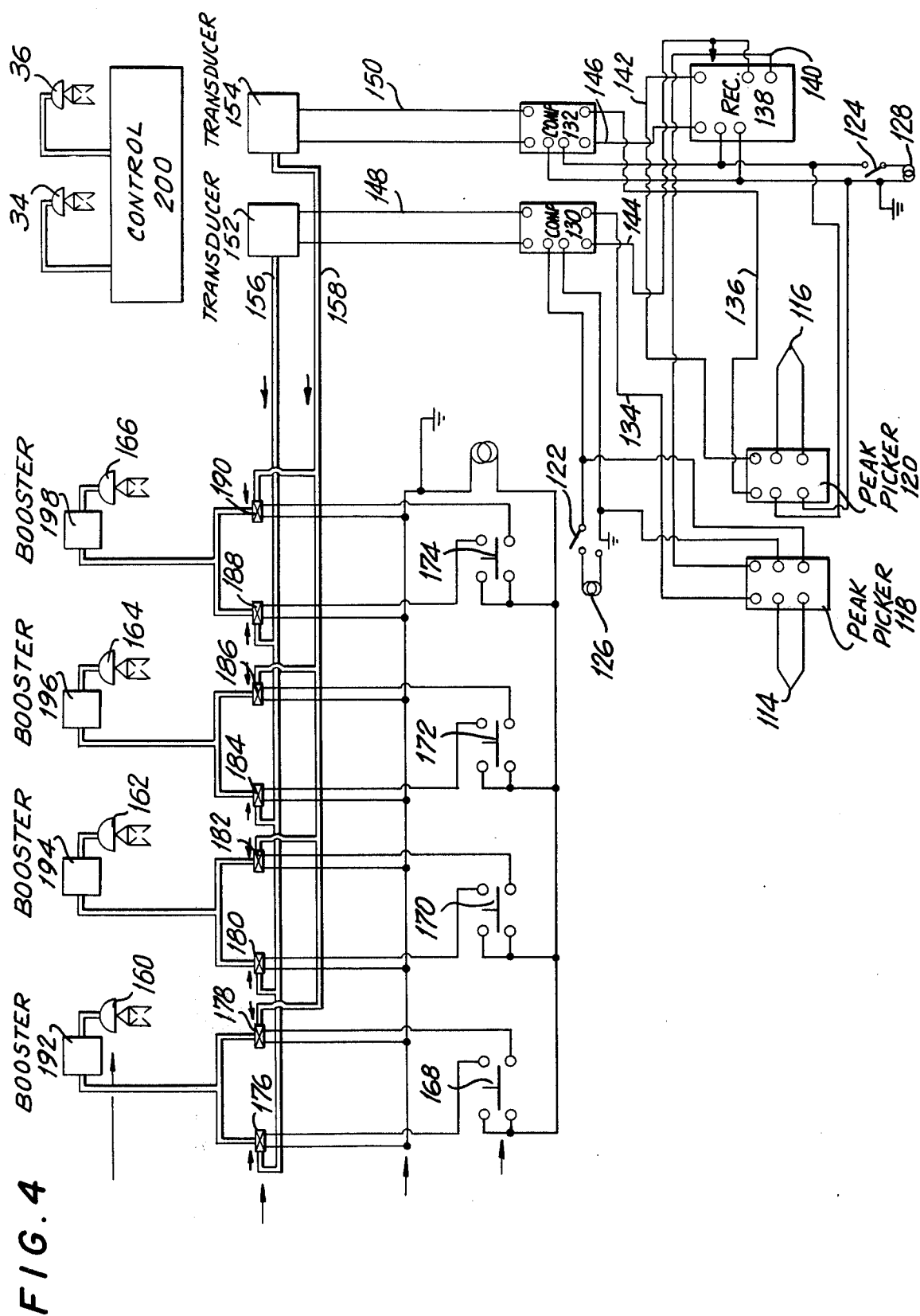
FIG. 4 is a partially block, and partially schematic, diagram of electrical circuits constituting the temperature measuring and reactor control elements associated with the reactor of FIG. 1.

In FIG. 4 are illustrated thermocouple groups 114 and 116 associated with each of the two zones indicated above. Thermocouple group 114 is connected to peak picker 118, whereas thermocouple group 116 is coupled to peak picker 120. The details of these peak pickers will be described hereinafter. It is sufficient at this point merely to understand that each peak picker operates to pass through one of the five thermocouple signals received, said one signal being that associated with the peak temperature in the associated zone. Power for peak picker 118 is controlled by switch 122, whereas power for peak picker 120 is controlled by switch 124. Power sources are indicated generally at 126 and 128.

Two controllers or comparators 130 and 132 are included in the circuit of FIG. 4. Comparator 130 receives power from source 126, whereas comparator 132 receives power from source 128. Comparator 130 is connected to peak picker 118 via line 134 and comparator 132 is connected to peak picker 120 via line 136.

A recorder and display unit 138 is also included in the circuit of FIG. 4. It is connected to peak picker 118 via line 140 and with peak picker 120 via line 142. Recorder 138 is connected with comparator 130 via line 144 and with comparator 132 via line 146. Recorder 138 and comparators 130 and 132 are connected in a loop circuit with peak pickers 118 and 120 and form load circuits therefor.

The function of recorder 138 is to record the peak voltages or temperatures for each of the two zones in the reactor downstream of the positions at which the initiator solutions are introduced and to display the same so that an operator can follow and analyze trends in the process if so desired. For this purpose, there may be employed a two-pen recorder which traces temperature and/or voltage recordings on a paper strip. A Yamataka Currentronik Trend Recorder manufactured by the Honeywell Corporation of Minneapolis, Minn. has been found very suitable for this function.

The purpose and function of comparators or controllers 130 and 132 are to receive peak indicating signals from peak pickers 118 and 120 and to compare these signals with operator-selected manually controllable signals indicative of the peak temperatures which are desired in the respective zones in the reactor of FIG. 1. Comparators 130 and 132 generate difference signals which are related to the differences between the magnitudes of the peak signals in said zones and the magnitudes desired therefor. These difference signals are transmitted onto lines 148 and 150. Commercially available controllers or comparators are employed for this purpose. One suitable controller is the commercially available Model 62H Controller manufactured by the Foxboro Instruments Corporation of Foxboro, Mass.

The signals on lines 148 and 150 are transmitted to transducers 152 and 154. In these transducers, the electrical signals received from comparators 130 and 132 are converted into pressure signals which are transmitted onto lines 156 and 158. Transducers 152 and 154 may be any type of transducer suitable for converting a signal of, for example, 10–50 milliamps to a pneumatic pressure signal of, for example, 3 to 15 psig. One such transducer which has been satisfactorily employed is the Type 546 Electropneumatic Transducer manufactured by the Fisher Governor Company of Marshalltown, Iowa.

Pumps which are adapted to be controlled by the signals on lines 156 and 158 have associated therewith control valves 160, 162, 164 and 166 indicative of the provision of four such pumps. While only two pumps are actually necessary (i.e., one for each of the aforesaid zones) four pumps are provided which may be selectively coupled to the indicated blocks by the use of switches 168, 170, 172 and 174. This permits holding one or more pumps in reserve to accommodate possible breakdowns. More particularly, lines 156 and 158 are connected to solenoids 176, 178, 180, 182, 184, 186, 188 and 190 which selectively feed valves 160, 162, 164 and 166, selection being controlled by selector switches 168, 170, 172 and 174.

Connected between solenoids 176 and 178 and valve 160 is a booster 192. Connected between solenoids 180 and 182 and valve 162 is a booster 194. A booster 196 is connected between solenoids 184 and 186, on the one hand, and valve 164 on the other hand. A booster 198 is connected between valve 166 and solenoids 188 and 190.

The function of the boosters 192, 194, 196 and 198 is to improve the stroking speed and frequency response of the pumps coupled to valves 160, 162, 164 and 166. Such boosters are well known and a commercially available booster has been employed in association with valves 160, 162, 164 and 166. This commercially available booster is the Model 61H Frequency-Response Booster manufactured by The Moore Products Company of Philadelphia, Pa.

Also illustrated in FIG. 4 are control valves 34 and 36 (see also FIG. 1). These valves are operated by control 200 as appears from U.S. Pat. No. 3,299,033 mentioned above. Whereas valves 34 and 36 control the flow of initiator solution from intensifiers 30 and 32 into the reactor, valves 160, 162, 164 and 166 control the speed of the intensifier pumps by controlling hydraulic fluid fed to these pumps (see, e.g., U.S. Pat. No. 3,234,833).

Figure 5:
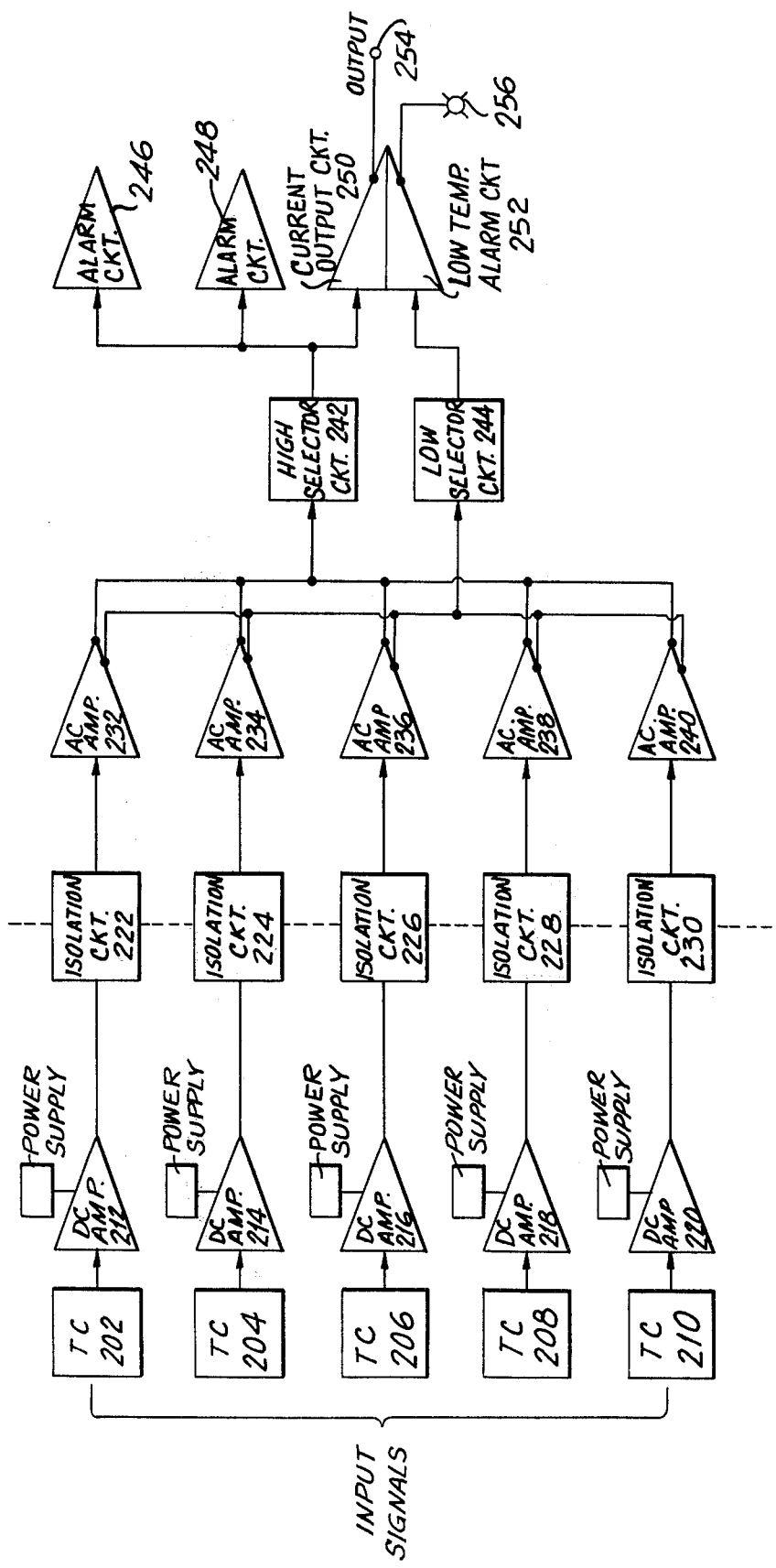
FIG. 5 is a diagram of a peak temperature picker or selection circuit included in the circuitry of FIG. 4.

FIG. 5 illustrates five thermocouples 202, 204, 206, 208 and 210 for one of the zones of the reactor of FIG. 1. These thermocouples feed into five DC amplifiers 212, 214, 216, 218 and 220 constituting elements in one of the peak pickers of FIG. 4. The DC amplifiers feed into isolation circuits 222, 224, 226, 228 and 230, each of which includes a chopper circuit to be described hereinafter. Circuits 222–230 feed into AC power amplifiers 232, 234, 236, 238 and 240 which in turn feed into high selector circuit 242, low selector circuit 244. High selector circuit 242 feeds into an alarm circuit 246 and an alarm circuit 248, as well as into a current output circuit 250 and a low temperature alarm circuit 252. Circuits 246 and 248 are circuits known from the prior art which form no part of the present invention. These are circuits which function to shut down the reactor system entirely in case of a runaway reaction or to reduce pressure in the reactor by a fixed percent in the event that an excessive pressure, which is less than a run-away pressure, is detected. Circuit 250 provides to terminal 254 the required output signal corresponding to the peak temperature measured or detected by thermocouples 202–210. The low temperature alarm circuit 252 responds to circuit 244 by producing a signal illuminating light 256. The purpose of this light is to indicate that one of thermocouples 202–210 has failed.

Figure 6:
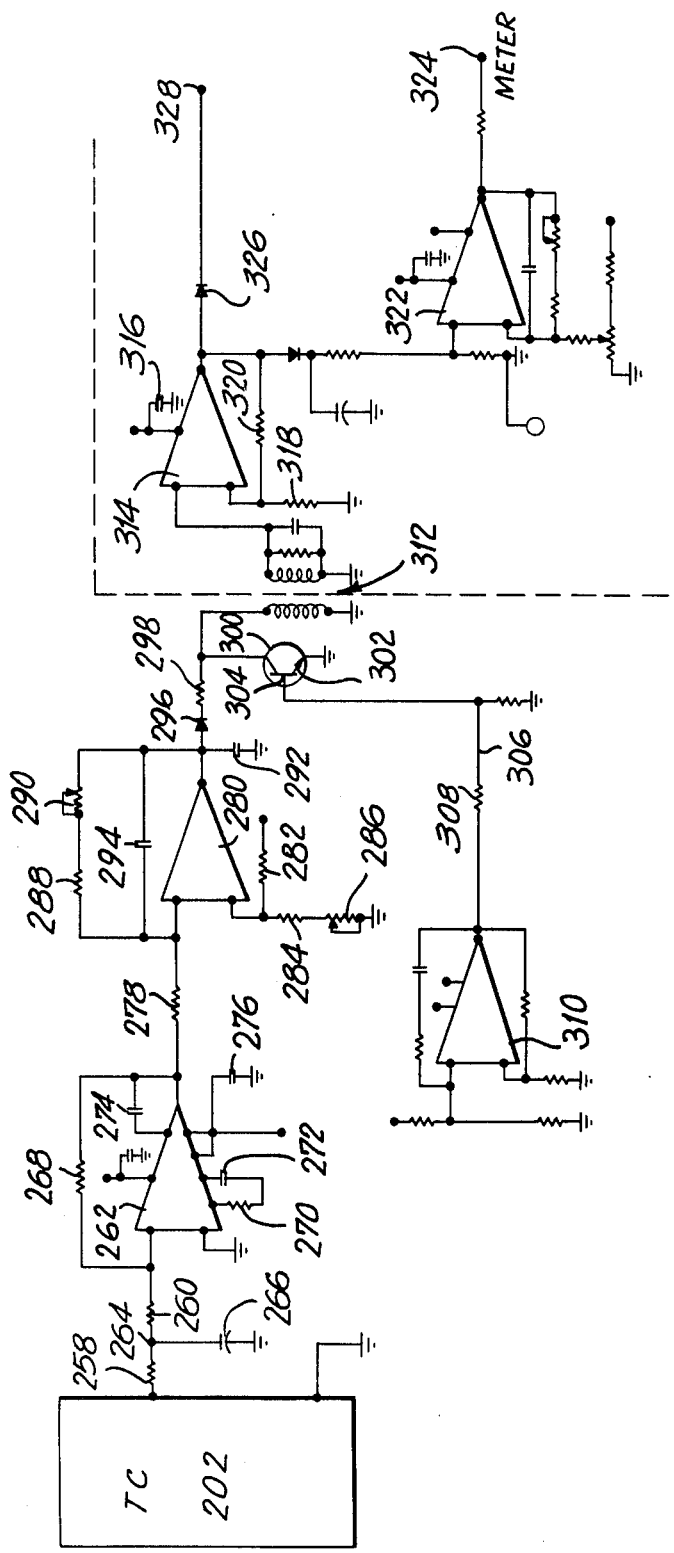
FIG. 6 is a schematic diagram of a part of the circuit of FIG. 5.

FIG. 6 illustrates schematically the circuit diagram for one of the thermocouples (e.g., thermocouples 202). In FIG. 6, it is seen that thermocouple 202 is connected via resistors 258 and 260 to a voltage amplifier 262 preferably having the form of an integrated circuit. Junction 264 between said resistors is connected to ground via capacitor 266. The signal transmitted via junction 264 to amplifier 262 may, for example, be in the order of 2–18 millivolts.

Resistors 268 and 270 and capacitors 272, 274 and 276 provide the bias and feedback necessary to accommodate the voltage and current magnitude of the circuits involved. Resistor 278 couples amplifier 262 to a second voltage amplifier 280 whose bias and feedback are provided by resistors 282, 284, 286, 288 and 290 and by capacitors 292 and 294.

Amplifier 280 is connected via diode 296 and resistor 298 to transistor 300 which is part of the isolating and chopper circuit referred to hereinabove.

Emitter 302 of the transistor is grounded, whereas its base 304 is connected via line 306 and resistor 308 to amplifier 310 which supplies a biasing voltage to the transistor. The transistor is connected via transformer 312 to power amplifier 314 to which is connected capacitor 316 and resistors 318 and 320. An amplifier 322 connected to the output of amplifier 314 provides a signal at terminal 324 coupled to a meter (not shown) enabling the voltage or temperature related to thermocouple 202 to be visually displayed.

Diode 326 constitutes an important element of the circuit of FIG. 6, and couples the output of amplifier 314 to terminal 328. The terminal 328 is common to all of the thermocouples of one zone; however, there is one diode 326 for each thermocouple. It thus is seen that the five diodes 326 related to a zone are connected in gating relationship to common terminal 328. As a result, only the peak or largest voltage of all the voltages generated by the thermocouples is transmitted to terminal 328. The remaining diodes are biased to cutoff. Since there is one terminal 328 for each zone in the reactor, there are two signals generated respectively representing the peak temperature for each zone. For this reason, the circuits of FIGS. 5 and 6 constitute peak pickers and are particularly the peak pickers 118 and 120 of FIG. 4.

With reference to the circuits and apparatus described above, polymerization of high pressure ethylene takes place as follows:

High pressure ethylene is introduced into the reactor from source 10. Initiator solution is introduced into the reactor from intensifiers 30 and 32. Temperature peaks occur in respective zones downstream of the positions at which the initiator solution is introduced. During the polymerization of the high pressure ethylene, pressure in the reactor is periodically reduced by operation of valve 70. This, as stated above, assists in preventing accumulation of polyethylene on interior walls within the system. Due to this bump cycle and for other reasons, the peak temperatures occurring in the zones referred to above do not have fixed positions, but instead are displaced within their respective zones. These zones are, however, limited and do not together take up the entire extent of the reactor. In each of the zones, the associated groups of thermocouples bracket the distance through which peak temperatures can be displaced during normal operation. The temperatures sensed by these two groups of thermocouples are converted into voltages which are fed to peak pickers 118 and 120 respectively. In these peak pickers, the voltages are amplified by DC amplifiers 212–220, chopped by circuits 222–230 and fed to power amplifiers 232–240 to provide an output signal of, for example, 10–50 milliamps. Peak signals may also be fed to terminal 324 for meter display purposes.

The gating circuit formed by connection of diodes 326 to common terminal 328 permits only the peak signal to be passed through the peak picker circuit. The peak signal for each of the two zones is fed to comparator or controller 130 or 132 respectively. The peak signals are also fed to recorder 138 whereat they are traced, according to known procedures, on paper strips for display purposes so that an operator can follow the trends of the peaks in each zone, irrespective of the positional shifting thereof.

Desired values for the peak temperatures in the respective zones are entered by an operator into comparators 130 and 132 which compare these selectable or adjustable signals with the peak voltages coming from peak pickers 118 and 120. Difference signals of the order of 10–50 milliamps are transmitted to transducers 152 and 154 which produce corresponding pneumatic signals which are transmitting via lines 156 and 158 and selected of solenoids 176–190 to valves 160–166. Selection is made by switches 168–174. Boosters 192–198 minimize the delay in responding to the signals produced on lines 156 and 158.

The two pumps selected by switches 168–174 are, in effect, the intensifiers 30 and 32 (FIG. 1). The valves 160–166 are the valves which control the speed of operation of these pumps in the manner set forth in U.S. Pat. No. 3,234,882 (see for example valve 14 is said patent). The outputs of the intensifiers are fed through valves 34 and 36 into the reactor system. Valves 34 and 36 are operated by control 200 in the manner appearing in U.S. Pat. No. 3,299,033 (see valve 18 in said patent).

From what has been stated hereinabove, it is seen that the peak voltage in each of the two zones in the reactor system is used to control the introduction of initiator solution at positions upstream of such zones. Despite the fact that the peak temperature may shift back and forth due to a variety of reasons, the peak temperature is always maintained under supervision. It is to be understood that some slight deviation is permissible such as, for example, might occur due to the presence of a peak intermediate the thermocouples. This, however, has not been found to be of significance in view of the speed of flow of materials through the reactor system. In such processes, where the possibility of peaks occurring intermediate adjacent thermocouples might be of importance, it would of course be possible to position additional thermocouples between the blocks thereby to minimize the importance of this problem.

From what has been stated hereinabove, it will be seen that the invention relates generally to an apparatus wherein an elongated reaction system receives raw materials in such a manner that a critical or peak temperature occurs in the system and is displaceable therein, the invention providing for monitoring the critical or peak temperature despite displacement of the same and for controlling the supply of at least one of the aforesaid materials to the reaction system based on said critical or peak temperature.

Generally, the method of the invention involves controlling a reaction which is taking place in an elongated reaction system in which there is a shifting temperature profile. From what has been stated herein, it will now be understood that the method involves establishing a temperature criterion such as, for example, a peak temperature and sensing temperatures at a plurality of stations spaced along the aforenoted system whereafter the reaction is controlled according to that sensed temperature which corresponds to the temperature criterion. In other words, if the reaction is to be controlled by the peak temperature then the peak temperature selected from the plurality of temperatures contributed by the various stations will be the controlling temperature irrespective of the fact that the peak temperature might first occur at one station and then shift to another.

According to the method of the invention, control of the reaction is preferably effected by controlling one of the materials introduced into the reactor. From the preferred embodiment described above, it is seen that, where the reaction is the polymerization of high pressure ethylene in which ethylene and initiator solution are supplied to the reaction system, control is effected by adjusting the amount of initiator solution supplied.

It will also be seen from the aforegoing description of the preferred embodiment that temperatures are sensed downstream of the location at which initiator solution is introduced into the reaction system. Moreover, it has been seen that the sensed temperatures are converted into electrical signals which are amplified and compared with a selected signal to produce a difference signal which is employed to control the reaction. This difference signal is preferably converted into a pressure signal which controls the introduction of the initiator solution.

Finally, it has been seen that the method of the invention preferably involves continuously displaying the peak temperature, this being effected, for example, by a recorder tracing one or more lines indicative of peak temperatures in the reactor system.

What is claimed is:

1. In apparatus comprising a source of materials and an elongated reaction system receiving said materials from said source and in which a process involving said materials takes place, there being in said reaction system a plurality of zones to each of which said source supplies at least one of said materials and in each of which a critical temperature occurs which is related to said process, the improvement comprising for each such zone first means responsive to the critical temperature therein substantially independently of the displacement of same for generating a signal representative of said critical temperature and second means responsive to said signal to control the supply of at least one of said materials to said zone, wherein said first means includes a plurality of heat-sensitive elements at spaced positions along said zone to generate signals in accordance with the temperatures at said positions and selection means coupled to said elements so as to select therefrom the signal representative of said critical temperature.

2. In apparatus comprising a source of materials and an elongated reaction system receiving said materials from said source and in which a process involving said materials takes place, there being in said reaction system a critical temperature which is related to said process and which is displaceable through a zone which constitutes a limited part of said system, the improvement comprising first means responsive to said critical temperature substantially independently of the displacement of same for generating a signal representative of said critical temperature and second means responsive to said signal to control the supply of at least one of said materials from said source to said system, wherein said first means includes a plurality of heat-sensitive elements at spaced positions through said zone to generate signals in accordance with the temperatures at said positions and selection means coupled to said elements so as to select therefrom the signal representative of said critical temperature and said second means is connected to said first means so as to respond only to a signal representing a temperature in said zone.

3. Apparatus as claimed in claim 2, wherein said second means includes a pump for supplying one of said materials to said reaction system, a control for controlling the flow of material from the pump to said system, and a second control controlling the speed of said pump and, in turn, controlled by said first means.

4. Apparatus as claimed in claim 2, wherein reaction system includes a tubular reactor including tubular sections, blocks connecting said sections, and water jackets operatively associated with said tubular sections and wherein said first means includes thermocouples mounted in at least some of said blocks and positioned to respond to the temperature of material passing through the system.

5. Apparatus as claimed in claim 2 further comprising means for periodically relieving pressure in said system.

6. Apparatus as claimed in claim 2, wherein said first and second means collectively comprise a plurality of thermocouples spaced along said system, gating means coupled to said thermocouples and passing the highest electrical signal generated thereby, comparison means to compare said highest signal with a selectable signal representative of a magnitude desired for said critical temperature and to generate an electrical difference signal related to the difference between said highest and selectable signals, transducer means responsive to said difference signal to generate a pressure signal and a valve responsive to said pressure signal to control said source.

7. Apparatus as claimed in claim 6, wherein said source includes a pump having a speed of operation dependent upon a fluid pressure delivered thereto, said valve controlling said fluid pressure and said second means including booster means coupled to said valve to enhance the time of response of said pump to changes in said pressure signal.

8. Apparatus as claimed in claim 6 comprising, in series between each said thermocouple and said gating means, a voltage amplifier, an isolating circuit coupled to said amplifier, and a power amplifier coupled to said isolating circuit.

9. Apparatus as claimed in claim 8 comprising a recording and display means in an electrically continuous loop with said gating means and said comparison means.

10. Apparatus as claimed in claim 8, wherein said isolating circuit comprises a transistor chopper and biasing means to bias said chopper.

11. Apparatus for the production of high pressure polyethylene comprising a tubular reactor having upstream and downstream ends; a source of ethylene coupled to said upstream end; means for receiving polyethylene from said downstream end; intensifier means for supplying initiator to said reactor to at least one position therein; the ethylene and polymerized ethylene moving through the reactor from said upstream to said downstream end and being subjected in said reactor to variations in temperature and pressure; first means to measure temperatures in said reactor at a plurality of stations spaced along said reactor within a zone extending downstream of said position but spaced from said downstream end; second means to select the peak temperature from the plurality of temperatures thus measured; and third means controlled by said peak temperature to control said intensifier means and adjust the supply of initiator to limit peak temperature fluctuation.

12. Apparatus as claimed in claim 11 comprising means to bump cycle said reactor by periodically relieving pressure therein and means between the intensifier means and reactor to control the supply of initiator.

13. Apparatus as claimed in claim 11 further comprising means to reduce pressure in the reactor by a selected amount when the pressure in the reactor exceeds a selected limit and means to terminate the reaction in the reactor when there is a run-away reaction therein.

14. Apparatus as claimed in claim 11, wherein said reactor is a tubular reactor including a plurality of tubular sections and blocks interconnecting said sections in serial relation.

15. Apparatus as claimed in claim 14, wherein said first means includes thermocouples, and rings mounted in those of said blocks located in said zone, said rings supporting said thermocouples, said tubular sections including flanges holding said rings in said blocks.

16. Apparatus as claimed in claim 14, said first means comprising heat-sensitive elements mounted in said blocks and extending into said reactor, said second means comprising amplifiers coupled to said elements to amplify signals generated thereby, diodes coupled to said amplifiers, and a common terminal connected to said diodes and forming therewith a gating circuit to pass the peak signal received from said amplifiers.

17. Apparatus as claimed in claim 16, said third means comprising comparator means to compare said peak signal with a selectable signal representative of a peak temperature desired in said zone and to generate a difference signal related to the difference therebetween.

18. Apparatus as claimed in claim 17, said third means comprising transducer means to convert said difference signal into a pneumatic signal, and means responsive to said pneumatical signal to generate a hydraulic force to control the speed of operation of said intensifier means.

19. Apparatus as claimed in claim 18 comprising recording means coupled in a loop with said comparator means and gating circuit and adapted for the continuous recorded display of peak signals appearing at said common terminal.

20. Apparatus as claimed in claim 18 comprising booster means between said transducer means and the means to generate said hydraulic force to enhance the response time of the latter said means.

* * * * *